3 Sheets—Sheet 1.

C. La DOW.

Harrow-Cultivator.

No. 8,159. Reissued April 9, 1878.

Witnesses. { Alex. Selkirk
Charles Selkirk

Charles La Dow

Inventor.

C. La DOW.

Harrow-Cultivator.

No. 8,159. Reissued April 9, 1878.

Witnesses. Alex. Selkirk, Charles Fewsik

Charles La Dow

Inventor.

3 Sheets—Sheet 3.

C. La DOW.

Harrow-Cultivator.

No. 8,159. Reissued April 9, 1878.

Witnesses. { Alex. Selkirk
Charles Lucas

Charles La Dow

Inventor

UNITED STATES PATENT OFFICE.

CHARLES LA DOW, OF ALBANY, NEW YORK.

IMPROVEMENT IN HARROW-CULTIVATORS.

Specification forming part of Letters Patent No. 187,392, dated February 13, 1877; Reissue No. 8,159, dated April 9, 1878; application filed March 22, 1878.

*To all whom it may concern:*

Be it known that I, CHARLES LA DOW, of the city of Albany, in the county of Albany and State of New York, have invented certain new and useful Improvements in Harrow-Cultivators; and I do hereby declare that the following is a full, clear, and exact description thereof, that will enable others skilled in the art to which it appertains to make and use the same, reference being had to the accompanying drawings, and to the letters of reference marked thereon, which form a part of this specification.

Figure 1:
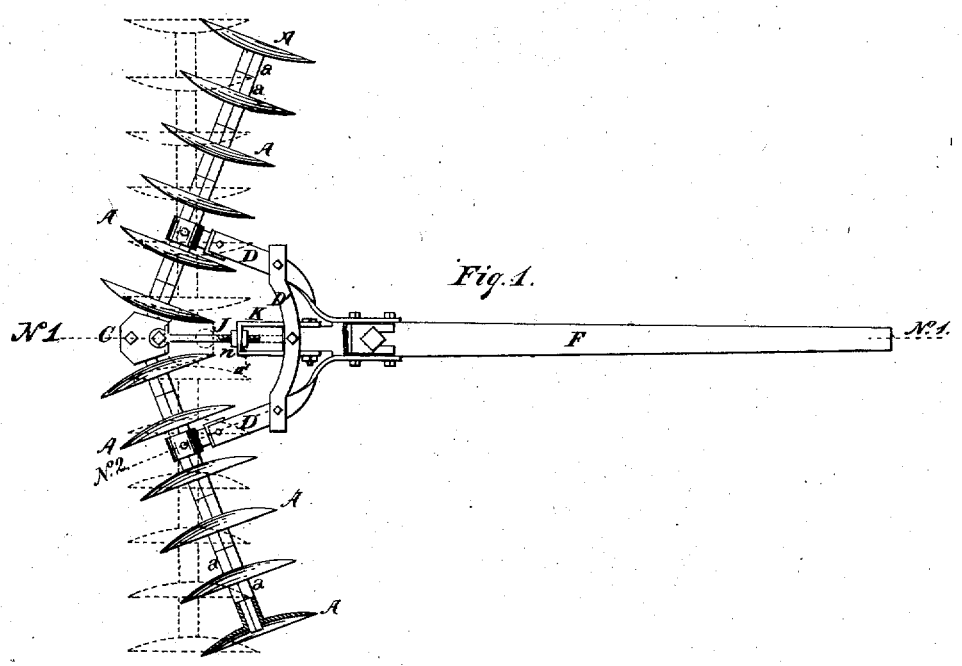
Figure 2:
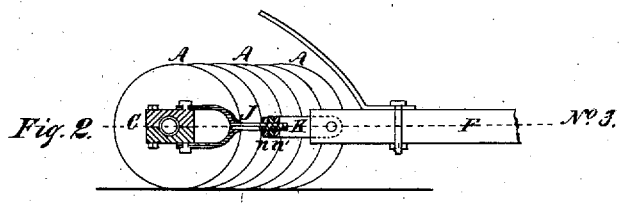
Figure 3:
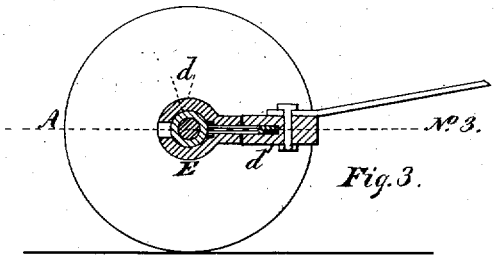
Figure 4:
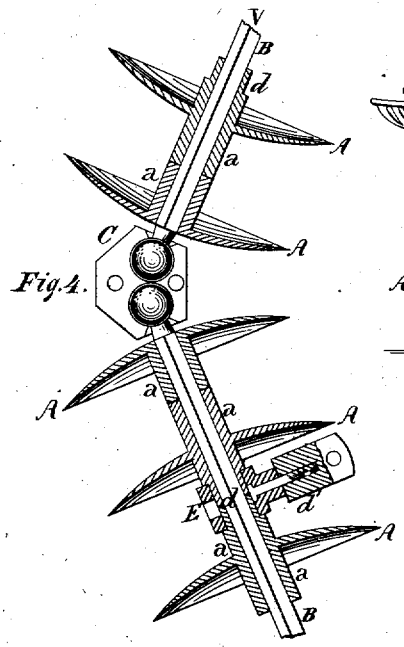
Figure 5:
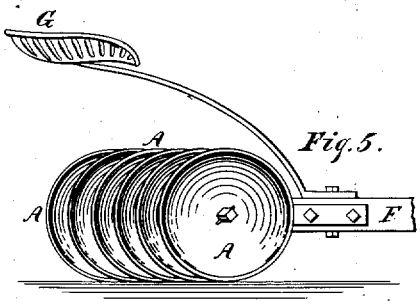
Figure 6:
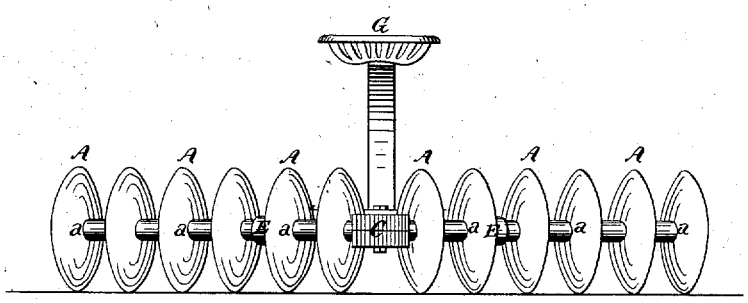
Figure 7:
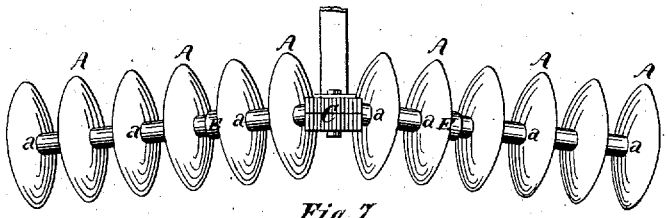
Figure 8:
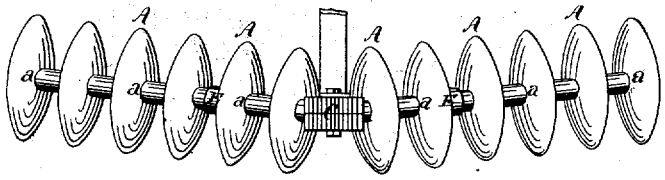

Figure 1 of said drawings represents a top or plan view of my improved harrow-cultivator. Fig. 2 represents a vertical longitudinal section of the same through the line No. 1 of Fig. 1, the draft-tongue not being sectioned. Fig. 3 represents a sectional elevation of the same, taken at the line No. 2 of Fig. 1. Fig. 4 represents a horizontal section of the same, taken at the line No. 3 of Fig. 2. Fig. 5 represents a side elevation of said improved harrow-cultivator. Figs. 6, 7, and 8 are rear views, illustrating the positions the disk-gangs (hereinafter described) may assume in conforming to the surface of the ground.

This invention relates to that class of harrow-cultivators in which the harrowing is effected by rotating disks arranged in gangs on shafts.

This invention consists, first, in flexibly connecting together the inner ends of the axles of the disk-gangs of a harrow-cultivator; second, in so jointing together the inner ends of the axles of a harrow-cultivator as to allow both vertical and horizontal vibration of the disk-gangs; third, in connecting the inner ends of the axles of the disk-gangs of a harrow-cultivator by a universal joint, whereby is permitted vibration of said gangs in all directions; fourth, in so constructing and arranging the disk-gangs of a harrow-cultivator that the inner ends of said gangs bear against each other; fifth, in a harrow-cultivator, the disk-gangs having their pivotal bearings directly upon their axles and at points between their ends, for the purpose of preventing bodily endwise swing of the gangs when vibrating; sixth, in flexibly connecting together the inner ends of the disk-gangs of a harrow-cultivator and doubly pivoting said gangs between their ends, so that the opposite ends of both gangs may have corresponding vertical and horizontal vibration; seventh, in so arranging the draft devices of a harrow-cultivator that the draft will be exerted directly upon the axles of the disk-gangs; eighth, in so connecting the hounds or extensions of the draft-tongue of a harrow-cultivator directly to the axles of the disk-gangs that said tongue may have a vertical vibration independent of said disk-gangs; ninth, in so arranging the adjustable disk-gangs, draft devices, and adjusting devices of a harrow-cultivator with relation to each other that the adjustment of the disk-gangs to various angles may be accomplished without disconnecting any of the parts of the implement; tenth, in the combination, in a harrow-cultivator, of the disk-gangs, an adjusting-screw connected to said gangs, and a pivoted bracket or holder in which said screw is adjusted; eleventh, in the combination, with the adjustable disk-gangs of a harrow-cultivator, of a pair of bars rigidly secured to the draft-pole at their forward ends, and serving both as draw-bars and braces for the disk-gangs; twelfth, in the combination, with the vibratory disk-gangs of a harrow-cultivator, of an intermediate holding-piece, whereby the connection between said gangs may be rendered either flexible or rigid at will; thirteenth, in the combination, with the disk-gangs of a harrow-cultivator, of bars connecting said gangs with the draft devices, and serving as braces against both endwise and lateral strain upon said gangs when said gangs are in any position, all of which will be hereinafter particularly described and explained.

In the accompanying drawings, A A represent concavo-convex wheels or disks, which have sharp edges for harrowing the soil. These disks are provided with hollow central hubs *a a*, which are mounted on shafts B B, and turn with the same. Each shaft and the disks mounted thereon constitute a disk-gang, which may rotate independently of the other.

The shafts B B of said disk-gangs are connected together by universal-joint coupling C, Figs. 1, 3, and 5. I make the connection between such gangs a double joint, so as to allow the usual vertical and horizontal adjustments of said gangs, whereby the latter are adapted to the inclination of the ground-surface and the quality and condition of the soil.

The balls of the ball-and-socket joints are arranged so as to bear against each other when said shafts are adjusted horizontally, or approximately so, into an inclined position.

The advantage of this arrangement is that the said gang-shafts then brace each other against the strain caused by the resistance of the earth, so as to relieve the bearings therefrom. The changes of horizontal position of said gangs are indicated in Fig. 1 by full and dotted lines, respectively, and Figs. 3, 7, and 8 show several vertical positions which may be assumed by them.

D D and D′ represent the frame, each letter indicating a part thereof, (D D being bars or hounds, and D′ a cross-bar,) to which frame pole or draft-tongue F is rigidly secured. The said disk-gangs are connected to the said frame by universal-joint bearings E E, which consist of a bearing surrounding the gang-shafts *d d*, made with the hubs *a a* of some two adjoining disks at a distance from the inner ends of the disk-gangs, as shown in Figs. 1, 2, 5, 7, and 8.

The double joints *d′ d′*, which connect the bearings E E to the frame above referred to, are preferably made as shown in Figs. 4 and 5, though any construction may be employed which will allow both vertical and horizontal vibration on said bearings E E. The vertical pivoting of said disk-gangs at a point between the ends of each allows one end of each gang to move downward at the same time that the other end thereof moves upward, so as to be readily accommodated to any inequality of ground. The horizontal pivoting of said gangs at said intermediate point allows a similar adjustment relative to the line of draft, whereby the angle at which the disks meet the soil may be varied to suit its character.

The connection of the aforesaid frame directly to the shafts of the disk-gangs, as above described, enables me to dispense with the supplementary frames heretofore used with each gang, and, furthermore, brings the draft in a horizontal line with said shafts, instead of applying it above the same, or in any other indirect and inconvenient manner. A draft directly forward does not have the same tendency to drag the disks down into the earth which is found in a draft from a point above said disks, and consequently the resistance and strain are lessened.

The pole F is rigidly secured to the frame D D D′, so that there is no flexibility at any point between the free outer end of said pole and the bearings E E. This rigid construction strengthens the pole and simplifies the construction of the machine as a whole, since the joints of bearings E E prevent the vibration of the said pole from being communicated to the shafts of said gangs, and thereby render flexibility in any part of the said pole unnecessary.

The driver's seat G is sustained by a seat bar or standard to the said pole or frame, and so arranged as to extend back over the disk-gangs, the driver's weight being equally distributed between the bearings E E, and serving, also, to balance the pole. The weight thus comes equally on both disk-gangs.

Connected with said disk-gangs and pole, and in a situation accessible by the driver from seat G, is mechanism for adjusting and holding the disk-gangs at any desired angle to the line of draft, which mechanism will permit the pole to be raised or lowered by the horses in passing over uneven ground without affecting the angle of the disk-gangs or preventing them from conforming with the surface of the ground. This mechanism consists, essentially, of a draw-rod, J, having a flexible connection with the inner ends of the disk-gangs, and capable of being drawn forward or forced rearward and set, while its front end is connected to the rigidly-secured pole or frame by means of a pivoted holding-piece, K. Said holding-piece will act with said draw-rod against the disk-gangs to hold them at the angle to which they may be adjusted, and at the same time will allow the said draw-rod to vibrate vertically in unison with the vertical vibrations of said disk-gangs when passing over uneven ground.

On the draw-rod projecting from the socket C, and projecting through the end of the holder K, are two check-nuts, *n n*. It is not necessary to remove either one of said nuts, nor any other part of the mechanism, in effecting any adjustment. The danger of losing or mislaying some important part of the mechanism is thus obviated.

The improvements above set forth considerably lessen the number of parts of the machine, and greatly reduce both its weight and the labor attending its construction, and at the same time they render the disk-gangs vibratory in both horizontal and vertical planes, their bearings being relieved of strain. They enable the machine to operate on uneven ground without the sudden raising or lowering of the pole affecting the angle of the disk-gangs.

The forward and backward adjustment of the draft-rod, by varying the horizontal angle of the draft-gangs, varies also the leverage of the resistance of the earth, and thereby compensates for any change in drivers from heavier to lighter, or vice versa. Thus the depth of the furrows can be kept unchanged throughout their entire length even when the drivers are changed.

In harrowing tough lumpy soils it is exceedingly difficult to make a flexible harrow work properly. I therefore make mine transformable at will into a stiff harrow, incapable of vertical movement. The pivot-bolt of the holding-piece K, when screwed tight, renders the harrow stiff, and when said bolt is loosened the connection between the gangs again becomes flexible.

Having thus fully described my invention, what I claim as new, and desire to secure by Letters Patent, is—

1. In a harrow-cultivator, the disk-gangs, having the inner ends of their axles flexibly connected together.

2. In a harrow-cultivator, the disk-gangs, jointed at their inner ends to allow both vertical and horizontal vibration.

3. In a harrow-cultivator, the disk-gangs, connected at their inner ends by universal joints, substantially as set forth.

4. In a harrow-cultivator, the disk-gangs, bearing directly against one another at their inner ends, for the purpose set forth.

5. In a harrow-cultivator, the disk-gangs, having their pivotal bearings directly upon their axles and at points between their ends, for the purpose of preventing bodily endwise swing of the gangs when vibrating, as set forth.

6. In a harrow-cultivator, the disk-gangs, doubly pivoted at points between their ends, and having their inner ends flexibly connected, so that opposite ends of both gangs may have corresponding vertical and horizontal vibration, substantially as set forth.

7. In a harrow-cultivator, the vibratory disk-gangs, having the draft devices connected directly to their axles.

8. In a harrow-cultivator having gangs of disks mounted on through-axles, a draft-tongue, connected, by lateral extensions or hounds, directly to said axles, and having vertical vibration independent thereon, substantially as described.

9. The combination, in a harrow-cultivator, of the adjusting devices, the draft-tongue and connections, and the adjustable disk-gangs, whereby the angles of the gangs may be adjusted at will for wide or narrow furrows without disconnecting any of the parts, as herein set forth.

10. The combination, in a harrow-cultivator, of the disk-gangs, an adjusting-rod, and a pivoted bracket or holder, by which said rod and the disk-gangs may be adjusted, for the purpose set forth.

11. In a harrow-cultivator, the combination, with the adjustable disk-gangs, of a pair of bars rigidly secured to the draft-pole at their forward ends, and serving both as draws-bars and braces for the disk-gangs.

12. The combination, in a harrow-cultivator, of the draft devices and vibratory disk-gangs with an intermediate holding-piece, for the purpose of rendering the connection of the gangs rigid at will.

13. The combination of the draft-bars G G and universal joints G′ G′ with the axle C C and the center-joint D, connecting the axles, and adjustably connected to the rear end of the draft-pole, for the purposes herein set forth.

14. The combination of the axles C C, universal joints G′ G′, braces G G, and universal center-joint D with the pivoted rod *b*, adjustably-pivoted stirrup H, pole E, and nuts *a a*, substantially as set forth.

15. The combination of the draft-bars G, boxes G′, braces J, pole E, and seat I with the flexibly-jointed axles C C and wheels A of a harrow-cultivator.

In testimony that I claim the foregoing I have hereunto set my hand this 21st day of March, 1878.

CHARLES LA DOW.

Witnesses:
WM. H. BABCOCK,
C. H. MCEWEN.